United States Patent
Yamamura et al.

(10) Patent No.: US 8,534,843 B2
(45) Date of Patent: Sep. 17, 2013

(54) IMAGE DISPLAY APPARATUS, INFORMATION PROCESSING APPARATUS, AND METHODS OF CONTROLLING THE SAME

(75) Inventors: Masaru Yamamura, Kawasaki (JP); Hidetoshi Wada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 12/967,460

(22) Filed: Dec. 14, 2010

(65) Prior Publication Data
US 2011/0149152 A1      Jun. 23, 2011

(30) Foreign Application Priority Data

Dec. 18, 2009  (JP) ................. 2009-288415
Dec. 1, 2010   (JP) ................. 2010-268722

(51) Int. Cl.
*G03B 21/14*  (2006.01)
*G09G 5/02*   (2006.01)
*G02B 7/28*   (2006.01)

(52) U.S. Cl.
USPC .......... 353/69; 353/121; 345/690; 345/589; 359/337; 396/115

(58) Field of Classification Search
USPC ............ 353/122, 13, 52, 69; 345/690, 589; 359/649, 337; 396/115
See application file for complete search history.

(56) References Cited

U.S. PATENT DOCUMENTS

| | | |
|---|---|---|
| 6,847,374 B2 | 1/2005 | Matsuda |
| 7,221,374 B2 * | 5/2007 | Dixon .......................... 345/591 |
| 7,595,811 B2 | 9/2009 | Matsuda |
| 2003/0117714 A1 * | 6/2003 | Nakamura et al. ........... 359/649 |

FOREIGN PATENT DOCUMENTS

JP      2002-125125      4/2002

* cited by examiner

*Primary Examiner* — Georgia Y Epps
*Assistant Examiner* — Magda Cruz
(74) *Attorney, Agent, or Firm* — Cowan, Liebowitz & Latman, P.C.

(57) ABSTRACT

Based on image data input to a display unit and an image on a display surface acquired by an acquisition unit, control is performed to decrease the difference between the input image data and the image displayed on the display surface.

20 Claims, 9 Drawing Sheets

IMAGE DISPLAY APPARATUS, INFORMATION PROCESSING APPARATUS, AND METHODS OF CONTROLLING THE SAME

BACKGROUND OF THE INVENTION

1. Field of the Invention

The present invention relates to an image display apparatus, information processing apparatus, methods of controlling the same, and to a computer program.

2. Description of the Related Art

In recent years, projectors, TVs, and the like have become popular as image display apparatuses. For example, projectors are used under various illumination environments, and can reproduce colors according to the actual projection environment illumination. On the other hand, CIECAM02 (CAM; Color Appearance Model) which is a chromatic adaptation model issued by CIE (Commission Internationale de l'Eclairage), and the like have been developed for color matching. Some projectors capable of displaying an image considering, for example, the illumination environment have also been developed by applying these techniques.

When applying the color reproduction considering visual adaptation to a projector, it is necessary to acquire information about light (ambient light) in the installation environment as visual environment information. To prevent degradation in the color reproducibility of the projection image, a method of measuring the ambient light by installing, for example, a CCD camera or an illuminance sensor in the projector, and adjusting the gamma characteristic and color temperature of the projection image in accordance with the measured ambient light is usable (Japanese Patent Laid-Open No. 2002-125125) (corresponding to U.S. Pat. Nos. 6,847,374 and 7,595,811).

However, when measuring ambient light using a photosensor, as in the image display apparatus, light displayed by the image display apparatus may be, for example, reflected by the surroundings and mixed into the photosensor. In this case, the ambient light information increases by the amount corresponding to the reflected and mixed light. If the image to be displayed is corrected using the ambient light information, the image correction accuracy may be reduced. In, for example, a projector, when an image output from the projector is projected onto the screen, and reflected light enters the photosensor, the image correction accuracy is reduced.

SUMMARY OF THE INVENTION

The present invention has been made in consideration of the above-described problem, and provides a technique of preventing the accuracy of image correction for ambient light from being degraded due to the influence of an image displayed by an image display apparatus.

According to the present invention, it is possible to provide a technique for preventing the accuracy of image correction for ambient light from degrading due to the influence of an image displayed by an image display apparatus.

According to one aspect of embodiments of the present invention, the present invention relates to an image display apparatus for displaying an image using an image projection unit adapted to project the image. The image display apparatus has an estimation unit adapted to, when the image projection unit is displaying the image, estimate second light information obtained by excluding influence of display of the image on an installation environment of the image display apparatus from first light information acquired by a photosensor adapted to acquire information of light under the installation environment, a correction unit adapted to correct an image signal input to the image projection unit using the second light information estimated by the estimation unit, and a conversion unit adapted to convert the image signal corrected by the correction unit into chrominance signals to drive the image projection unit. Wherein the image projection unit may display the image based on the chrominance signals, and the estimation unit may estimate the second light information based on a plurality of pieces of first light information obtained upon measurement by the photosensor under each of a plurality of conditions corresponding to different projection light amounts of the image projection unit.

According to another aspect of embodiments of the present invention, the present invention relates to an information processing apparatus for supplying an image signal to an image display apparatus for displaying an image using an image projection unit adapted to project the image. The information processing apparatus has an estimation unit adapted to, when the image projection unit is displaying the image, estimate second light information obtained by excluding influence of display of the image on an installation environment of the image display apparatus from first light information acquired by a photosensor adapted to acquire information of light under the installation environment, a correction unit adapted to correct the image signal using the second light information estimated by the estimation unit, and a transmission unit adapted to transmit the image signal corrected by the correction unit to the image display apparatus. Wherein the estimation unit may estimate the second light information based on a plurality of pieces of first light information obtained upon measurement by the photosensor under each of a plurality of conditions corresponding to different projection light amounts of the image projection unit.

According to further aspect of embodiments of the present invention, the present invention relates to a display apparatus including a display unit adapted to display an image. The display apparatus has an acquisition unit adapted to acquire first ambient light information under an installation environment of the display apparatus when the image is being displayed on the display unit, an estimation unit adapted to estimate second ambient light information obtained by excluding influence of the image displayed on the display unit from ambient light information based on a plurality of pieces of first ambient light information obtained by the acquisition unit while changing a display light amount of the display unit, and a conversion unit adapted to convert a color of the image displayed on the display unit based on the estimated second ambient light information.

According to further aspect of embodiments of the present invention, the present invention relates to an information processing apparatus for supplying an image signal to a display apparatus including a display unit adapted to display an image. The information processing apparatus has an acquisition unit adapted to acquire first ambient light information under an installation environment of the display apparatus when the image is being displayed on the display unit, an estimation unit adapted to estimate second ambient light information obtained by excluding influence of the image displayed on the display unit from ambient light information based on a plurality of pieces of first ambient light information obtained by the acquisition unit while changing a display light amount of the display unit, and a conversion unit adapted to convert a color of the image displayed on the display unit based on the estimated second ambient light information.

Further features and advantages of the present invention will become apparent from the following description of the embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

The embodiments will be described with reference to the drawings.

First Embodiment

Figure 1:
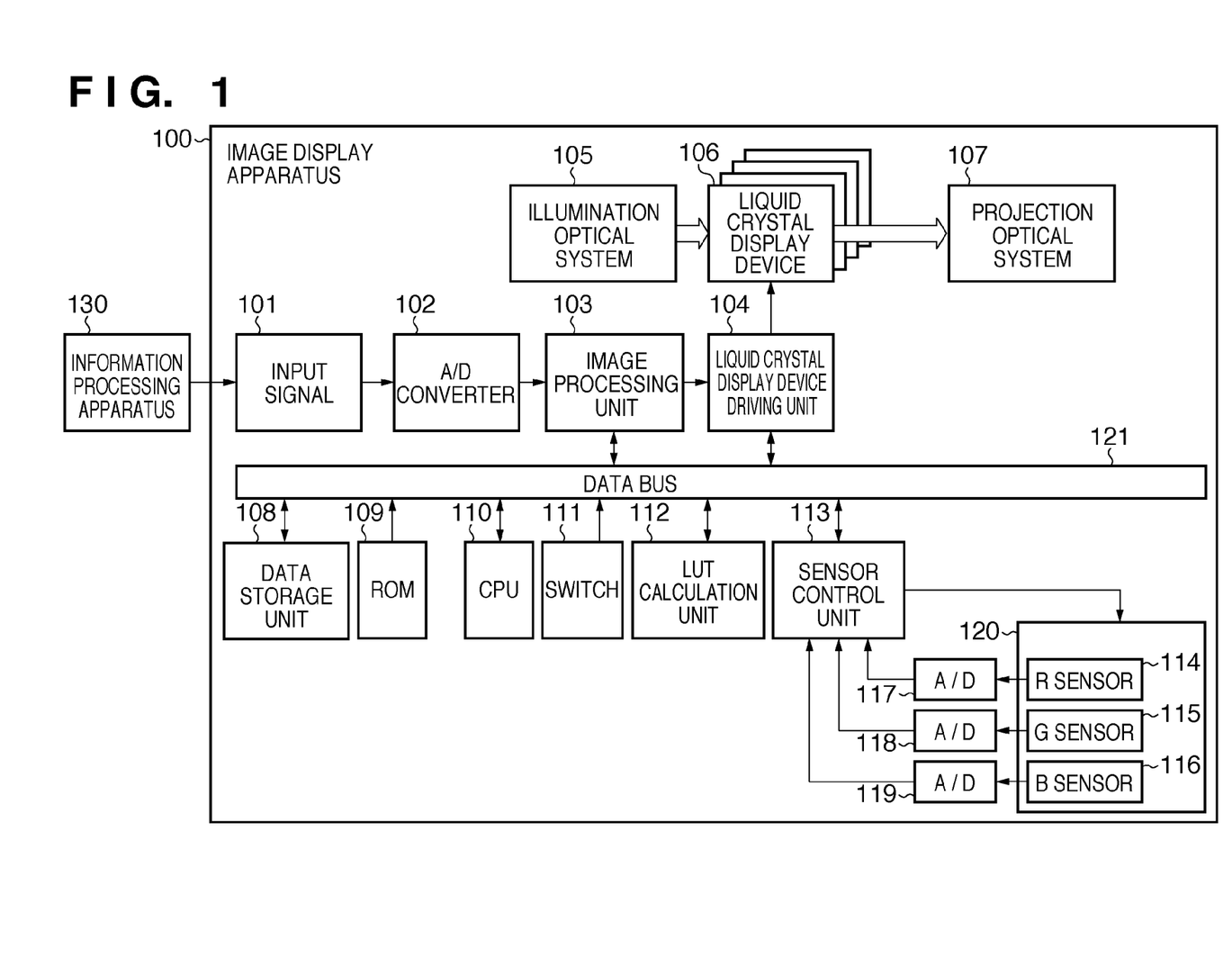
FIG. 1 is a functional block diagram showing an example of the arrangement of an image display apparatus 100.

The arrangement of an image display apparatus 100 to which the present invention is applied is shown in FIG. 1. FIG. 1 illustrates major constituent elements of the image display apparatus 100 according to the embodiment. An input signal 101 is an image signal sent from an external information processing apparatus 130 connected to the image display apparatus 100. The information processing apparatus 130 includes source devices such as a personal computer, a DVD player, and a TV tuner. An analog/digital (A/D) converter 102 converts the input signal 101 from the information processing apparatus 130 into a digital signal. However, if the input signal 101 from the information processing apparatus 130 is a digital signal, A/D conversion of the A/D converter 102 is unnecessary. An image processing unit 103 converts the resolution of the digital image signal into those suitable for red, green, and blue liquid crystal display devices 106, and performs ambient light correction for the image signals after the resolution conversion. The image processing unit 103 also performs, for example, double-speed conversion and VT gamma correction necessary for a liquid crystal display device driving unit 104 to drive the liquid crystal display devices 106, thereby generating a liquid crystal display device driving signal.

The liquid crystal display devices 106 receive a light beam emitted by an illumination optical system 105, and send, to a projection optical system 107, light beams based on control by the liquid crystal display device driving signal from the liquid crystal display device driving unit 104. The projection optical system 107 performs a zoom operation via lenses, and projects the light beam from each liquid crystal display device 106 onto an external screen or the like as projection light.

A data storage unit 108 implemented by a RAM (Random Access Memory), a hard disk, or the like stores a three-dimensional lookup table (3D-LUT) created by an LUT calculation unit 112. The RAM area of the data storage unit 108 also serves as the work area of a CPU 110, and stores predetermined data and programs to be executed by the CPU 110. Programs to be executed by the CPU 110, data of ideal white of a screen, and the like are written in a ROM (Read Only Memory) 109 in advance.

Figure 7A:
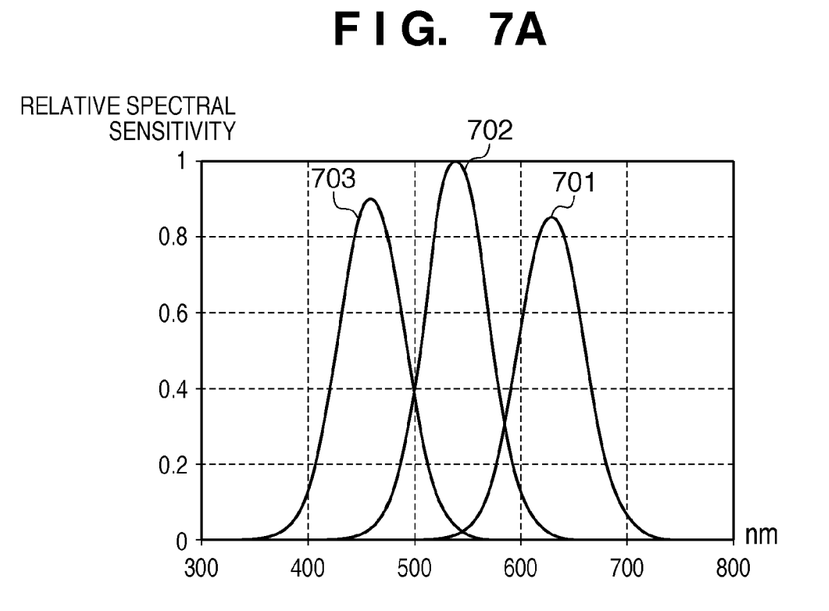
FIGS. 7A and 7B are graphs showing the relative spectral sensitivities of sensors and a black body locus based on the relative spectral sensitivity.
Figure 7B:
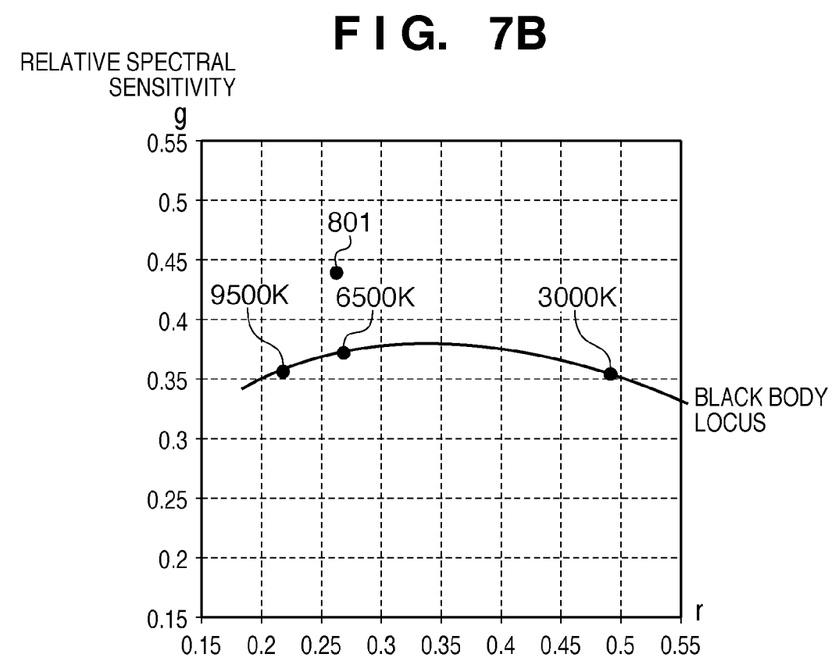

The CPU 110 is a central processing unit which executes the processing programs stored in the ROM 109 and the data storage unit 108, thereby performing overall control of the image display apparatus 100. A switch 111 receives a user operation and sends a signal based on the operation to the CPU 110 via a data bus 121. The LUT calculation unit 112 receives data from an ambient light sensor 120, generates the 3D-LUT for color conversion by an operation to be described later, and stores the 3D-LUT in the data storage unit 108. The ambient light sensor 120 includes an R sensor unit 114, G sensor unit 115 and B sensor unit 116 which have the relative spectral sensitivities shown in FIG. 7A. Referring to FIG. 7A, normalization is done by defining the maximum sensitivity of the G sensor unit 115 as 1. The relative spectral sensitivities of the R sensor unit 114, G sensor unit 115, and B sensor unit 116 are represented by 701, 702, and 703, respectively. When a black body locus is plotted on an rg chromaticity diagram (CIE1931) based on the sensitivities of the sensors, the characteristic shown in FIG. 7B is obtained.

Data measured by the R sensor unit 114, G sensor unit 115, and B sensor unit 116 are converted into digital signals by an analog/digital (A/D) converters 117, 118, and 119, respectively, and sent to a sensor control unit 113. The sensor control unit 113 receives the output data from the A/D converter (R) 117, A/D converter (G) 118, and A/D converter (B) 119, converts them into a format suitable for processing of the CPU 110, and also drives the ambient light sensor 120 based on an instruction from the CPU 110.

Note that the ambient light sensor 120 and the corresponding A/D converters 117 to 119 may be installed in the image display apparatus 100 in advance or retrofitted as external devices. The ambient light sensor 120 (only the ambient light sensor 120 or together with the A/D converters 117 to 119) may be arranged outside the apparatus to acquire ambient light information via an interface for wired or wireless connection.

Figure 2:
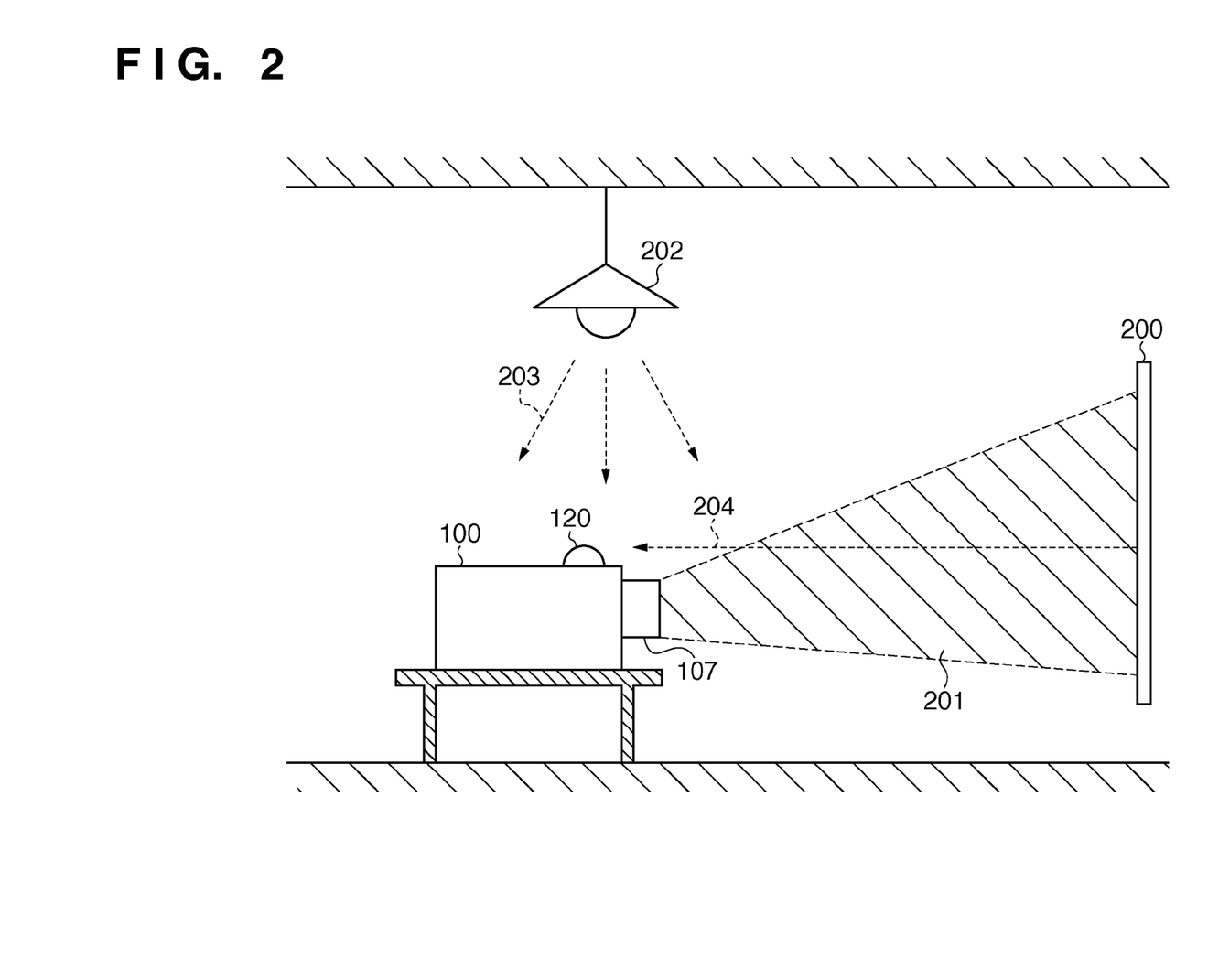
FIG. 2 is a view for explaining an example of use of the image display apparatus 100.

FIG. 2 is a view for explaining an example of use of the image display apparatus 100 of the present invention. The image display apparatus 100 having the arrangement in FIG. 1 causes the projection optical system 107 to project a projection image 201 to a screen 200. At this time, the projection image 201 is affected by the color of the screen 200 or illumination light 203 emitted by an illumination device 202 serving as the source of ambient light. For example, even displaying white, the light may be colored or change brightness depending on the type of screen 200. In addition, color reproduction changes depending on the color temperature or type of illumination light 203.

The ambient light sensor 120 receives reflected projection light 204 of the projection image 201, the illumination light 203, and other external light, and outputs information of light under the installation environment of the image display apparatus 100 as a sensor value. Based on the light information obtained by the ambient light sensor 120, the image processing unit 103 implements correction of color change of the display image, that is, ambient light correction. First light information near the installation environment of the image display apparatus 100, which is obtained by the ambient light sensor 120 and includes the reflected projection light 204, illumination light 203, and external light, will be referred to as "first ambient light". Second light information obtained by removing, from the first ambient light, the influence of image display of the image display apparatus 100 on the installation environment, that is, the reflected projection light 204 will be referred to as "second ambient light".

The internal arrangement of the image processing unit 103 will be explained next with reference to FIG. 3. The digital image signal input from the A/D converter 102 is first processed by a resolution conversion unit 301. The resolution conversion unit 301 converts the resolution of the image signal into those suitable for the red, green, and blue liquid crystal display devices 106, and outputs the RGB image signals after resolution conversion to an ambient light correction unit. A measurement data conversion unit 302 converts XYZ values (tristimulus values) that are the measurement data of first ambient light measured by the ambient light sensor 120 into RGB values serving as sensor values based on $$R = 3.2401 * X - 1.5374 * Y - 0.4986 * Z$$

$$G = -0.9692 * X + 1.8760 * Y + 0.0416 * Z$$

$$B = 0.0556 * X - 0.2040 * Y + 1.0570 * Z$$

and outputs them to an ambient light estimation unit 303.

Based on the RGB values of first ambient light acquired from the measurement data conversion unit 302, the ambient light estimation unit 303 estimates the RGB values of second ambient light. The RGB values of second ambient light are provided to an ambient light correction unit 304. The ambient light correction unit 304 corrects the image signals from the resolution conversion unit 301 based on the values of second ambient light.

A color conversion processing unit 305 performs color conversion processing using a 3D-LUT corresponding to the type of light source under the installation environment of the image display apparatus 100, which is estimated from the second ambient light. In this color conversion processing, the input image signals are converted into chrominance signals corresponding to the integrated gamut of the illumination optical system 105, liquid crystal display devices 106, and projection optical system 107 using the 3D-LUT. More specifically, these optical systems have predetermined gamuts. The input signals are converted using the 3D-LUT such that they are suitable for the sRGB gamut or an arbitrary gamut when projected via the optical systems. A gamma correction unit 306 performs gamma correction to correct the VT characteristic of the liquid crystal display devices 106, and inputs the signals to the liquid crystal display device driving unit 104.

Ambient light correction processing according to the embodiment will be described next with reference to FIG. 4. When the image display apparatus 100 is powered on in step S401, the CPU 110 causes the ambient light sensor 120 to acquire sensor values $R_L$, $G_L$, and $B_L$ of second ambient light in step S402. More specifically, the ambient light sensor 120 such as an illuminometer or a luminance meter measures the XYZ values, and the measurement data conversion unit 302 converts them into RGB values based on the above-described transformation expressions. At this time, the image display apparatus 100 can directly acquire the second ambient light because the apparatus is not projecting an image, and is therefore not affected by the reflected projection light 204 of light projected by itself. Next, in step S403, the CPU 110 causes the illumination optical system 105 of the image display apparatus 100 to turn on the light source so as to perform image projection using the liquid crystal display devices 106 and the projection optical system 107. Note that if image projection is performed immediately upon powering on the apparatus main body in step S401, second ambient light data measurement in step S402 cannot be done, though this poses no serious problem in itself. However, to obtain a higher second ambient light estimation accuracy, measurement in step S402 can be performed.

In step S404, the CPU 110 measures first ambient light in the image projection state as shown in FIG. 2, and the measurement data conversion unit 302 obtains sensor values $R_{L+R}$, $G_{L+R}$, and $B_{L+R}$ based on the measurement data from the ambient light sensor 120. At this time as well, the ambient light sensor 120 such as an illuminometer or a luminance meter measures the XYZ values, and the measurement data conversion unit 302 converts them into RGB values based on the above-described transformation expressions. The CPU 110 provides the sensor values to the ambient light estimation unit 303. In step S405, the ambient light estimation unit 303 holds them. In step S406, the CPU 110 determines based on the number of held sensor values whether the number of first ambient light measurements has reached a predetermined number of times (N times). Note that N is a natural number of 2 or more, and can arbitrarily be set in accordance with the installation environment and the like. If the predetermined number of measurements are completed ("YES" in step S406), the process advances to step S407. On the other hand, if the number of measurements is smaller than the predetermined number of times ("NO" in step S406), the process returns to step S404 to continue the measurement. Every time the measurement is performed, the projection light amount is changed by controlling the liquid crystal display devices 106. That is, each measurement is done under a different projection light amount.

Figure 6A:
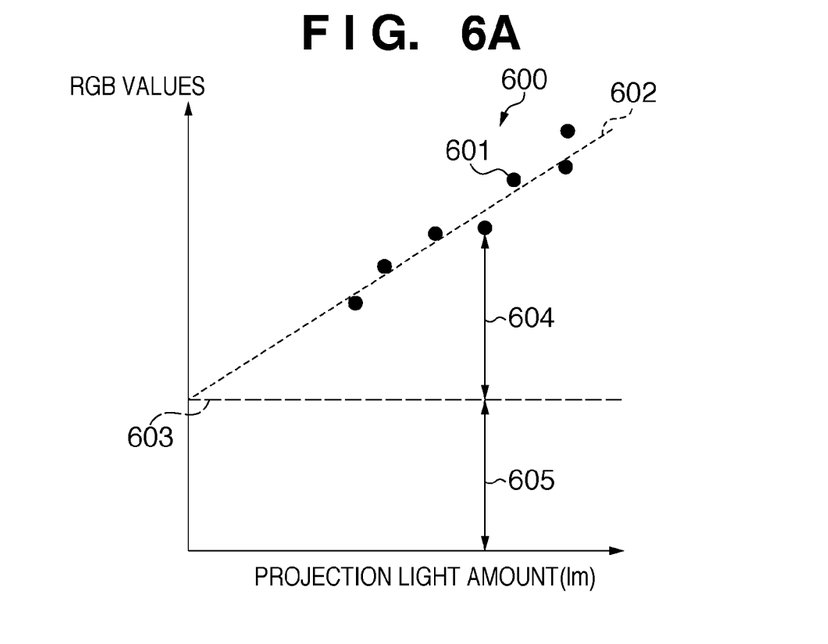
FIGS. 6A and 6B are graphs for explaining a method of estimating the value of second ambient light.

In step S407, the CPU 110 causes the ambient light estimation unit 303 to estimate the values of second ambient light by applying the least square method to the sensor values $R_{L+R}$, $G_{L+R}$, and $B_{L+R}$ of first ambient light obtained by the N measurements. The estimation method will be explained with reference to FIG. 6A. FIG. 6A is a graph that plots the N data of a sensor value obtained by measuring first ambient light. The abscissa represents the projection light amount (1 m) of the image display apparatus 100, and the ordinate represents the sensor value. FIG. 6A plots, for example, the data of the sensor value $R_{L+R}$. Similarly, graphs that plot the data of the sensor values $G_{L+R}$ and $B_{L+R}$ may be used.

The projection light amount can be specified for each color based on, for example, the control voltage of the liquid crystal display device. More specifically, the projection light amount is calculated from a value obtained by integrating all pixel data of the output of the gamma correction unit 306 for each color. A Full HD has 1,920×1,080=2,073,600 pixels for each color. The pixel data are integrated for each frame, thereby calculating the projection light amount (1 m) of each frame for each color. A graph 600 plots N sensor values 601. The least square method is applied to the N sensor values 601, thereby drawing an approximate line 602 using the projection light amount as a variable. This allows the approximate lines 602 of RGB to be obtained by $$R_{L+R} = A_R \cdot l_R + R_L \quad (1)$$

$$G_{L+R} = A_G \cdot l_G + G_L \quad (2)$$

$$B_{L+R} = A_B \cdot l_B + B_L \quad (3)$$

where $A_R$, $A_G$, and $A_B$ are the slopes of the approximate lines 602 of RGB, and represent the reflectances (of projection light) on the screen; $l_R$, $l_G$, and $l_B$ are projection light amounts of RGB, and $R_L$, $G_L$, and $B_L$ represent an intercept 603 of the ordinate. The intercept 603 of the line 602 of each of RGB can be estimated as a value when the projection light amount from the image display apparatus 100 is minimum (0 lm). Hence, a region indicated by an arrow 604 corresponds to the amount of change of the sensor value caused by the reflected projection light 204 of the image display apparatus 100. For this reason, a region indicated by an arrow 605 corresponding to the intercept 603 is estimated to correspond to second ambient light generated by external light and illumination around the image display apparatus 100. In this embodiment, second ambient light is estimated using this method. However, it may be estimated by, for example, a method using weighted values of the N data of the sensor values $R_{L+R}$, $G_{L+R}$, and $B_{L+R}$ of first ambient light. Any method capable of estimating second ambient light to some degree is usable.

Referring back to FIG. 4, in step S408, the CPU 110 causes the ambient light estimation unit 303 to substitute the values $R_L$, $G_L$, and $B_L$ of second ambient light estimated in step S407 into $$r = R_L/(R_L+G_L+B_L) \quad (4)$$

$$g = G_L/(R_L+G_L+B_L) \quad (5)$$

so as to calculate the chromaticity of the illumination light 203.

Figure 8A:
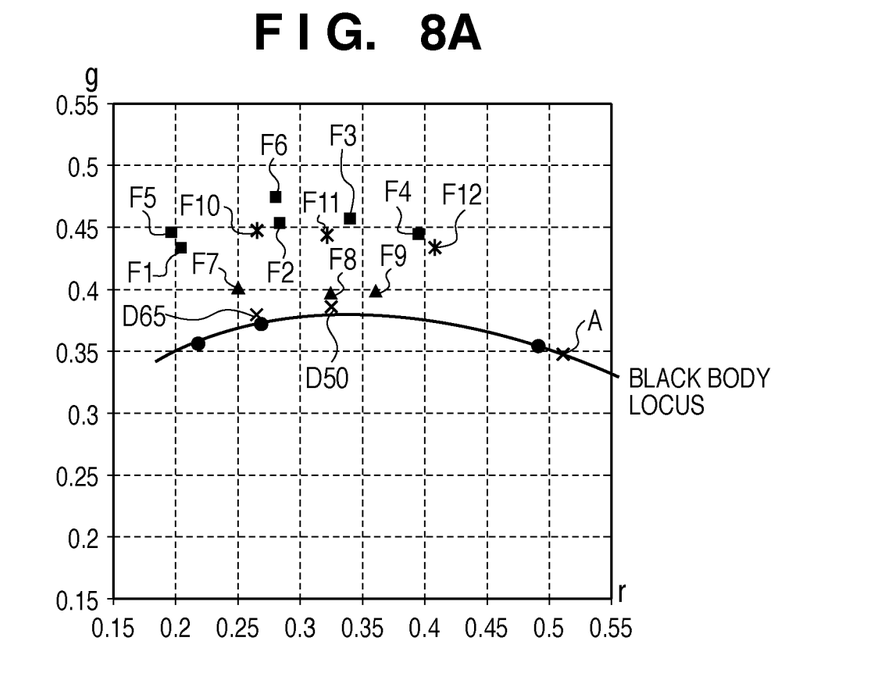
FIGS. 8A and 8B are rg chromaticity diagrams showing the standard light source distribution.
Figure 8B:
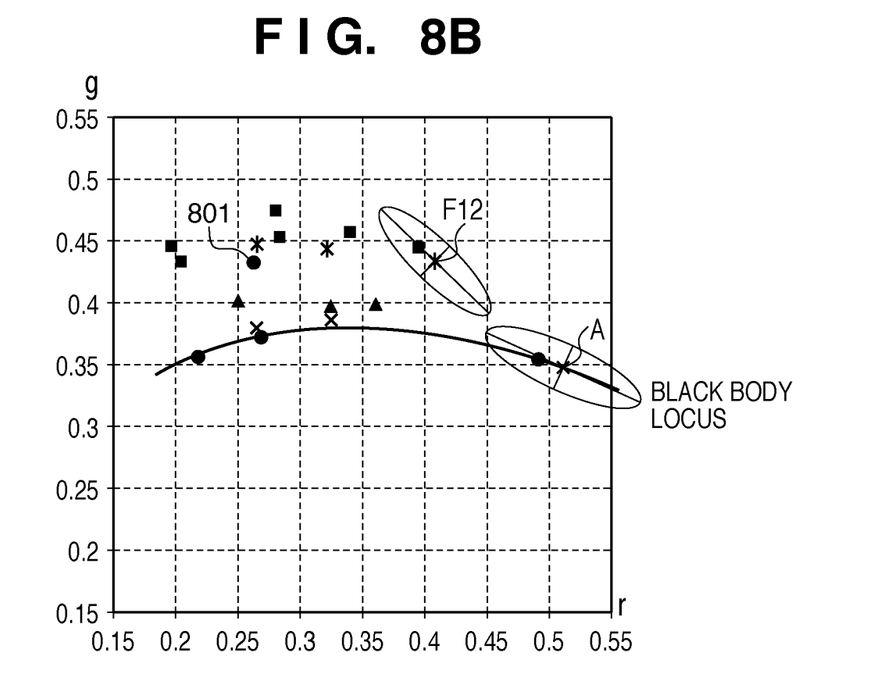

FIG. 7B shows an example in which the calculated chromaticity is plotted on the rg chromaticity diagram (point 801), and a black body locus and points at 9500 K, 6500 K, and 3000 K for the sake of comparison. In step S409, the type of source of ambient light (the illumination device 202 in this case) is calculated based on the chromaticity calculated in step S408. Concerning each of 15 types of standard light sources, that is, F1 to F12 (fluorescent lamps), A (white light source), D50 (5000 K), and D65 (daylight), the ROM 109 stores the central value and main component information regarding rg chromaticity in advance as likelihood determination data. The ambient light estimation unit 303 reads out the likelihood determination data and compares it with the chromaticity calculated in step S408. FIG. 8A shows the distribution of central values of the standard light sources on the rg chromaticity, which are stored in the ROM 109 as the likelihood determination data. FIG. 8B shows the main component information of the A light source and the F12 light source as examples of main component information. In FIG. 8B, two axes that intersect at right angles at a central value represents a main component, and an ellipse represents a locus that ensures a predetermined likelihood. The ambient light estimation unit 303 obtains the likelihood for each of the above-described 15 types of light sources based on the chromaticity calculated in step S408, and the light source with the highest likelihood is determined as the type of source of ambient light. For example, if the chromaticity calculated in step S408 is represented by the point 801 in FIGS. 7B and 8B, the type of light source of the illumination device 202 is estimated as F10. That is, the ambient light estimation unit 303 estimates the type of light source as the closest one of the above-described 15 types of light sources based on the chromaticity calculated in step S408.

In step S410, the LUT calculation unit 112 calculates to generate a 3D-LUT for color conversion in accordance with the type of light source estimated in step S409. According to the human visual characteristic, for example, ambient light around a projection image changes the appearance of the projection image. The appearance also changes depending on the intensity and chromaticity of ambient light. In this embodiment, a 3D-LUT is generated for color correction so as to make, for example, the appearance of a projection image under fluorescent light and that under incandescent light as equal as possible in consideration of the human visual characteristic. To do this, in this embodiment, the type of ambient light is estimated in step S409. More specifically, the LUT calculation unit 112 generates a 3D-LUT for color light correction based on the value of second ambient light obtained from the ambient light estimation unit 303. The color conversion processing unit 305 executes color correction based on the generated 3D-LUT.

Details of this processing will be described later with reference to FIG. 5. In step S411, the ambient light correction unit 304 performs ambient light correction for the image signals suitable for the red, green, and blue liquid crystal display devices 106 from the resolution conversion unit 301 based on the value of second ambient light obtained from the ambient light estimation unit 303. In ambient light correction, the values $R_L$, $G_L$, and $B_L$ are subtracted from the image signals. At this time, a predetermined weight may be assigned to each value. Note that the image signals corrected by the ambient light correction unit 304 undergo color conversion by the color conversion processing unit 305 using the 3D-LUT generated in step S409.

The 3D-LUT creation processing in step S410 of FIG. 4 will be described next with reference to FIG. 5. Note that this processing is performed by the LUT calculation unit 112 upon receiving an instruction from the CPU 110. Before the processing, 16 types of profiles are prepared in advance as destination-side profiles by measuring the color on the screen 200 in an unilluminated state and under illuminations corresponding to F1 to F12, A, D50, and D65. These profiles are stored in the data storage unit 108 or the ROM 109.

In step S501, a set of RGB values corresponding to an LUT grid point is acquired. In step S502, the acquired RGB values are converted into XYZ values based on a device model on the side of the source device such as a PC or a DVD layer. Note that sRGB or Adobe RGB is applicable as the device model on the source device side. In this embodiment, sRGB is used as an example of the device model on the source device side. However, the present invention is not limited to this. In step S503, the XYZ values calculated in step S502 are converted into JCh values based on CIECAM02 on the source device side issued by CIE. In step S504, gamut mapping is performed based on the gamut on the source device side and that on the destination device side. In this case, colors in the gamut on the destination device side are not converted. On the other hand, colors outside the gamut on the destination device side are mapped to the destination-side gamut surface at the shortest distance by gamut mapping. The destination device is the image display apparatus 100. Note that the gamut on the source device side and that on the destination device side are calculated in advance before the processing.

In step S505, the JCh values calculated in step S503 are converted into XYZ values based on CIECAM02 on the destination device side. In step S506, the XYZ values calculated in step S505 are converted into RGB values based on the device model on the destination device side. Note that the profile on the destination device side to be used in this step is selected from the above-described 16 types of profiles. In step S507, it is determined whether converted RGB values have been calculated for all LUT grid points. If YES in step S507, the process advances to step S508. If NO in step S507, the process returns to step S501. In step S508, the 3D-LUT for conversion is stored in the data storage unit 108. The processing thus ends.

An example has been described above in which the image display apparatus 100 includes the LUT calculation unit 112 that is hardware for generating a 3D-LUT in accordance with an instruction from the CPU 110. However, the 3D-LUT generation method is not limited to this. That is, instead of providing the LUT calculation unit 112, the CPU 110 may generate a 3D-LUT by calculation based on predetermined software. In this embodiment, a case has been described in which the LUT calculation unit 112 generates a 3D-LUT in accordance with the type of light source under a determined installation environment. Instead, for example, 3D-LUTs corresponding to the types of illumination light 203 may be prepared in the data storage unit 108 or the ROM 109 in advance, and a 3D-LUT may be selected in accordance with the determination result in step S409.

Figure 4:
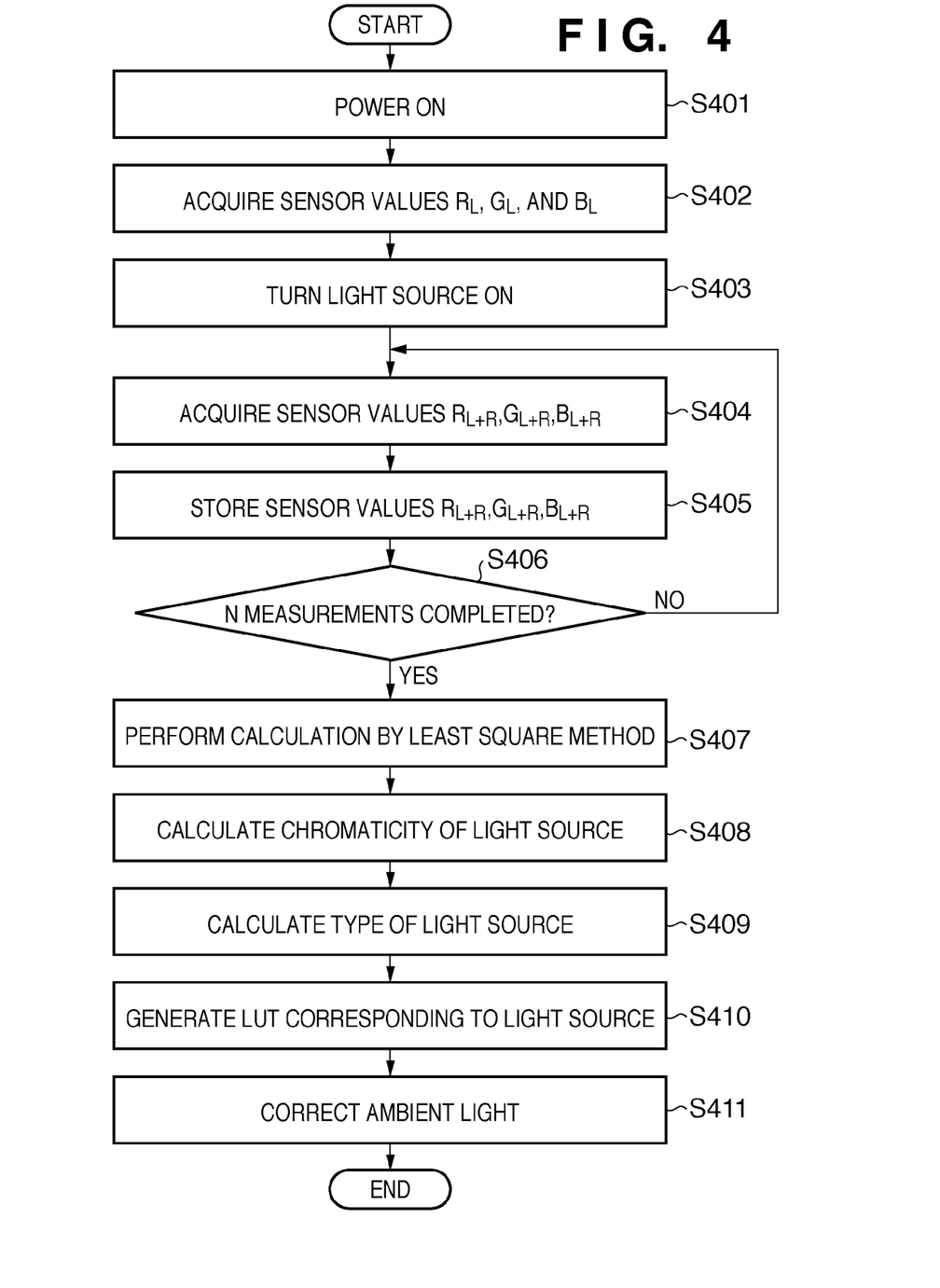
FIG. 4 is a flowchart illustrating an example of ambient light correction processing.
Figure 5:
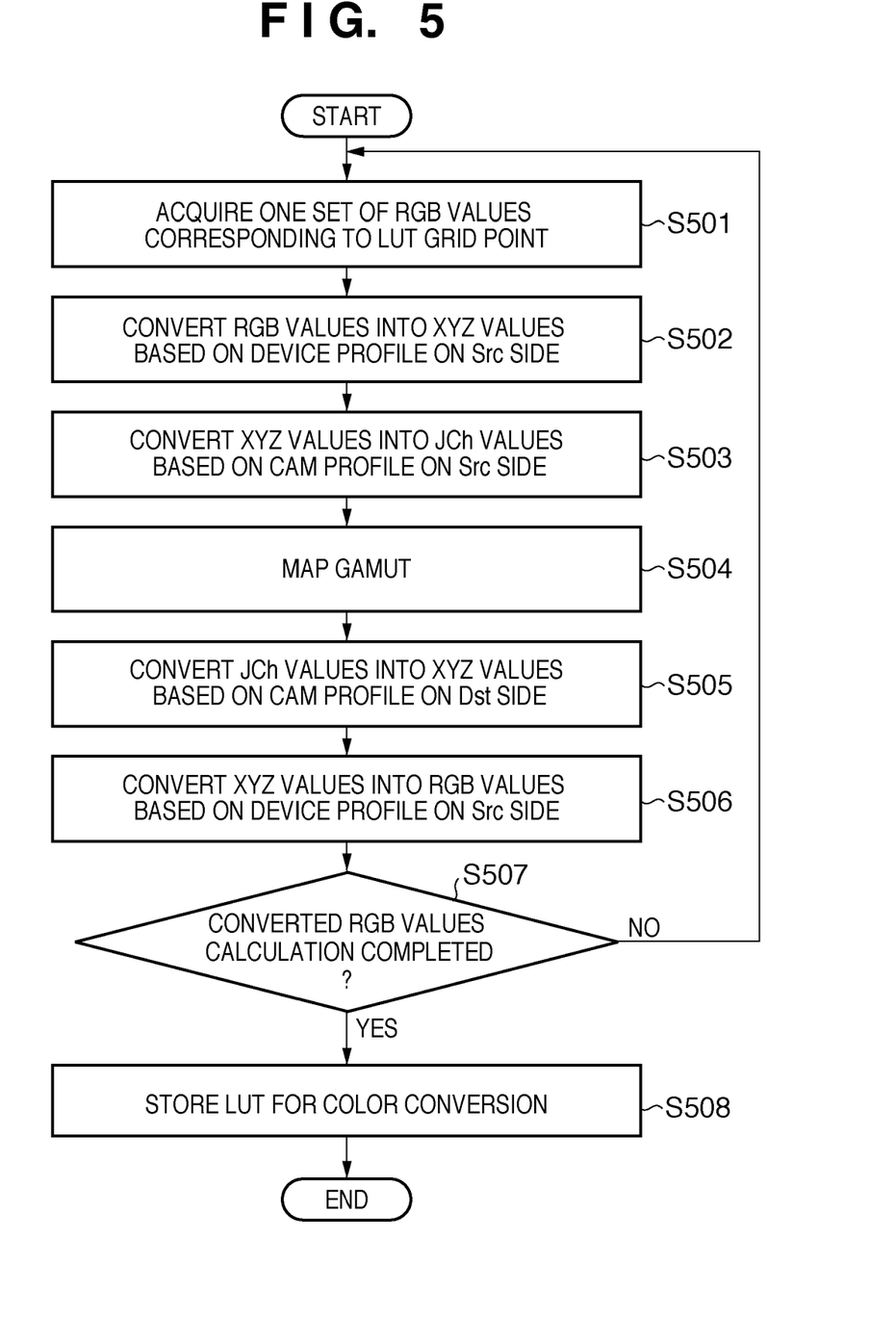
FIG. 5 is a flowchart illustrating an example of 3D-LUT generation processing.

In the above-described embodiment, the LUT calculation unit 112 generates the 3D-LUT for color conversion in step S410 of FIG. 4. However, the embodiment of the present invention is not limited to this. For example, optimum 3D-LUTs under illuminations corresponding to F1 to F12, A, D50, and D65 to be estimated as second ambient light may be stored in the data storage unit 108 or the ROM 109 in advance before the processing. In this case, since 15 types of light sources are assumed, 15 types of 3D-LUTs are stored. However, less 3D-LUTs may be prepared. In that case, if there are a plurality of types of light sources estimated based on the chromaticity, the intermediate value between them is obtained by calculation.

In the process of step S410, the LUT calculation unit 112 selects an optimum 3D-LUT in accordance with the type of ambient light estimated by the ambient light estimation unit 303 in step S409. More specifically, if the type of ambient light estimated by the ambient light estimation unit 303 is F6, the LUT calculation unit 112 selects the 3D-LUT corresponding to F6 stored in the data storage unit 108 or the ROM 109. If the type of ambient light is A, the 3D-LUT corresponding to A is selected, as a matter of course. If the type of ambient light is estimated as ambient light between, for example, F6 and F2, the LUT calculation unit 112 generates an optimum 3D-LUT by calculating the intermediate value between the 3D-LUT for F6 and that for F2. That is, the LUT calculation unit 112 generates or selects an optimum 3D-LUT in accordance with the type of ambient light estimated by the ambient light estimation unit 303 in step S409. The 3D-LUT may be generated by adding user's taste in color to the 3D-LUT corresponding to each type of ambient light. In step S411, the color conversion processing unit 305 can perform color correction of input image signals using the 3D-LUT generated by the LUT calculation unit 112 in step S410.

Even after settings are done to do ambient light correction in step S411 of FIG. 4, the CPU 110 may estimate the ambient light while displaying the image by repeating the process in steps S404 to S411 at an arbitrary timing. If the estimated type of ambient light has changed, the LUT calculation unit 112 selects a 3D-LUT suitable for the estimated ambient light from the data storage unit 108 or the ROM 109. Alternatively, the LUT calculation unit 112 may generate the 3D-LUT by calculation, as described above.

After the setting in step S411, the 3D-LUT may newly be selected or generated upon detecting a deviation of the RGB values of first ambient light from the approximate line obtained in step S407. For example, upon detecting that the RGB values of first ambient light deviate from the approximate line obtained in step S407 by a predetermined amount or more continuously for a predetermined time, the CPU 110 executes the process in steps S404 to S409. The CPU 110 causes the ambient light estimation unit 303 to estimate the ambient light. If the estimated type of ambient light has changed, the LUT calculation unit 112 selects a 3D-LUT suitable for the estimated ambient light from the data storage unit 108 or the ROM 109. Alternatively, the LUT calculation unit 112 may generate the 3D-LUT by calculation, as described above.

Figure 6B:
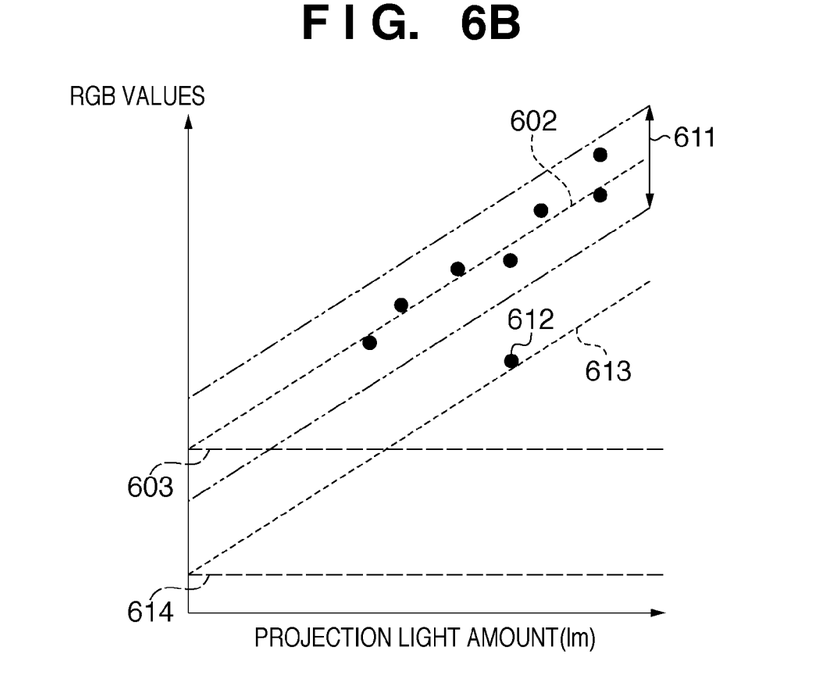

The ambient light may be estimated from the deviation amount from the approximate line without executing the process in steps S404 to S409. More specifically, when, for example, a value like 612 is detected for a predetermined time, the approximate line 602 in FIG. 6B is switched to a line 613. The offset is then represented by a value 614. This makes it possible to calculate the RGB values of second ambient light. The ambient light estimation unit 303 detects the closest light source type in FIG. 8A based on the calculated R and G values, thereby estimating the light source. As in step S410, the LUT calculation unit 112 selects a 3D-LUT suitable for the estimated light source from the data storage unit 108 or the ROM 109. Alternatively, the LUT calculation unit 112 may generate the 3D-LUT by calculation, as described above.

Note that in this embodiment, an apparatus using liquid crystal display devices has been exemplified as the image display apparatus 100. However, the device is not limited to one using liquid crystal display devices. The apparatus can be either a projection type apparatus such as a projector (including both front projection and rear projection) or an apparatus like a TV apparatus (including a display for a personal computer) that displays an image on the screen of its own. That is, it only need be a display apparatus capable of displaying a video considering ambient light, for which a displayed video may be reflected by a wall, ceiling, and the like and return to a sensor for capturing ambient light.

As described above, according to this embodiment, second ambient light obtained by excluding the component of the reflected projection light 204 from first ambient light can be estimated based on the sensor values of first ambient light obtained by a plurality of measurements without interrupting projection of the image display apparatus 100. It is therefore possible to prevent a decrease in the accuracy of image correction even when the ambient light sensor 120 detects reflected light of the display image of the image display apparatus 100, and the acquired information of ambient light changes. It is also possible to prevent a decrease in the accuracy of image correction without stopping display of the image display apparatus to eliminate the influence of reflected light of the image.

Second Embodiment

In the above-described first embodiment, when the image display apparatus 100 is projecting an image, second ambient light generated by ambient illumination, external light, and the like is estimated from first ambient light obtained by a plurality of measurements, thereby performing ambient light correction. In the second embodiment, however, a case will be described in which when brightness of the installation environment has changed after ambient light correction, ambient light correction is performed in real time. The main constituent elements of an image display apparatus 100 according to this embodiment are the same as those shown in FIGS. 1 to 3, and the chart of 3D-LUT creation is also the same as in FIG. 5.

In this embodiment, sensor values $R_{L+R}$, $G_{L+R}$, and $B_{L+R}$ are acquired again after the elapse of a predetermined time from ambient light correction in step S411 of FIG. 4. An ambient light estimation unit 303 calculates the deviation amount between the reacquired sensor values and the approximate line calculated in step S407. If the deviation amount of the reacquired sensor values from the approximate line is larger than a predetermined threshold Th, the process in steps S404 to S406 is repeated again to re-estimate second ambient light and re-execute ambient light correction. Note that when re-estimating, even if the image display apparatus 100 is projecting an image on a screen 200, the projection processing need not be interrupted. This is because during image projection, the projection light amount on the screen 200 normally changes in accordance with the projected contents (for example, a movie or a sport video). The plurality of measurements are executed using the change.

The situation wherein the ambient light correction of this embodiment is executed again will be described with reference to FIG. 6B. The upper side of FIG. 6B plots the sensor values $R_{L+R}$, $G_{L+R}$, and $B_{L+R}$ of first ambient light based on a predetermined measurements that have already been performed, as in FIG. 6A. The abscissa represents the projection light amount of the image display apparatus 100, and the ordinate represents the sensor value. A line 602 is the approximate line of plotted data. The plotted data are assumed to be distributed within the range of a width 611 with respect to the approximate line 602. On the other hand, a point 612 plots a sensor value obtained by measurement after the elapse of a predetermined time from the above-described ambient light correction. If this value falls outside the range of the width 611 with respect to the approximate line 602, the second ambient light is estimated to have greatly changed. More specifically, an intercept 614 between the ordinate and an approximate line 613 obtained by applying the same slope as that of the approximate line 602 to the point 612 is much smaller than the intercept 603, as is apparent. This occurs because, for example, the user adjusts the brightness of illumination light 203, and the brightness of the installation environment lowers.

As described above, according to the embodiment, even when ambient light has changed during image display, the image can be re-corrected by re-estimating the ambient light to cope with the change. This allows to prevent degradation in image quality.

Third Embodiment

In the above-described first and second embodiments, second ambient light is estimated based on the sensor values of first ambient light obtained by a plurality of measurements. Instead, the second ambient light may be estimated by estimating reflected projection light 204. For example, an ambient light estimation unit 303 converts the input image signal in consideration of the color of a screen 200 (wall color correction) or the reflectance of the screen 200, thereby estimating sensor values $R_R$, $G_R$, and $B_R$ of the reflected projection light 204. The estimated values of the reflected projection light 204 are subtracted from the sensor values of first ambient light, respectively, thereby estimating sensor values $R_L$, $G_L$, and $B_L$ of second ambient light.

Fourth Embodiment

In the above-described first to third embodiments, the image display apparatus 100 estimates second ambient light and performs ambient light correction. However, this processing need not always be done by an image display apparatus 100 itself, and an information processing apparatus 130 such as a DVD player or a personal computer which supplies an image to the image display apparatus 100 may perform the processing. In this case, the source device acquires first ambient light acquired by an ambient light sensor 120 of the image display apparatus 100 so as to estimate second ambient light, and outputs an image signal obtained by performing ambient light correction to the image display apparatus. Generation or selection of a 3D-LUT is also done by causing the source device to designate the type of light source or the 3D-LUT itself for the image display apparatus. For example, if the source device is a personal computer, a program describing a program code for such an operation is installed in the personal computer.

Figure 9:
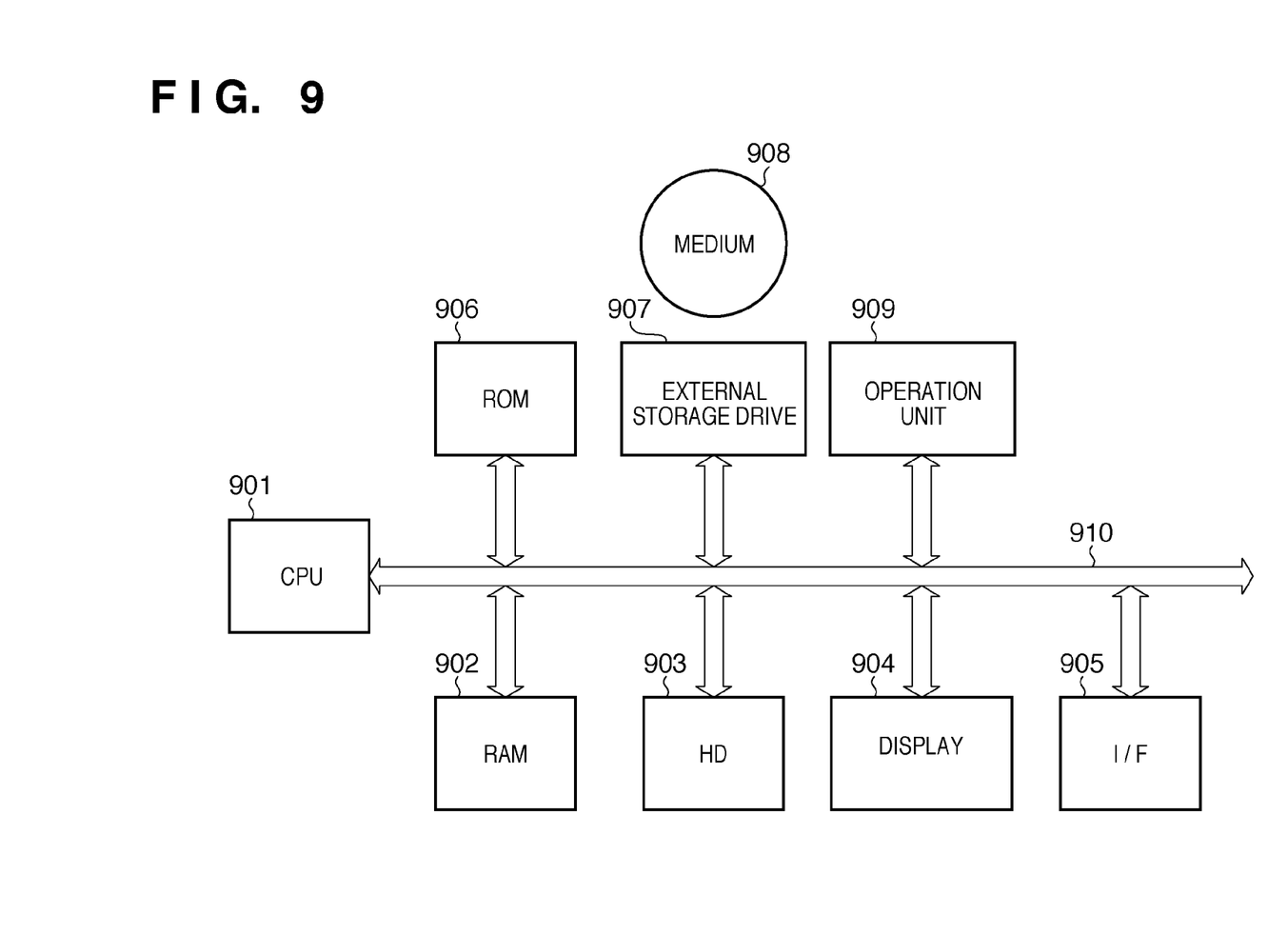
FIG. 9 is a functional block diagram showing an example of the arrangement of an information processing apparatus 130.

FIG. 9 is a functional block diagram showing an example of the hardware configuration of the information processing apparatus 130. Referring to FIG. 9, a CPU 901 executes the OS, application programs, and the like stored in an HD (Hard Disk) 903 so as to control to cause a RAM 902 to temporarily store information, files, and the like necessary for executing the program. The RAM 902 functions as the main memory or work area of the CPU 901. The HD 903 stores, for example, application programs, driver programs, OS, control programs, and process programs to be used to execute processing according to the embodiment.

A display 904 serves as a display device for displaying, for example, a command input from an operation unit 909 or information acquired from outside. The display 904 may be the image display apparatus 100 or any other display. An interface (to be referred to as an I/F hereinafter) 905 is a communication interface to be connected to an external device. If the display 904 is not the image display apparatus 100, the apparatus is connected to the image display apparatus 100 via the I/F so as to communicate with it, thereby providing an image signal or acquiring data measured by the ambient light sensor 120. An arbitrary connection protocol such as USB, IEEE1394, or HDMI is usable. A ROM 906 stores programs such as a basic OS program.

An external storage drive 907 can load a program or the like stored in a medium 908 to the computer system. The medium 908 serving as a recording medium stores predetermined programs and associated data. If the information processing apparatus 130 is a DVD player, the medium is a DVD. The operation unit 909 serves as an interface to be used by the operator of the apparatus to input instructions, and is formed from a keyboard and a mouse. A system bus 910 controls the data flow in the apparatus.

Figure 3:
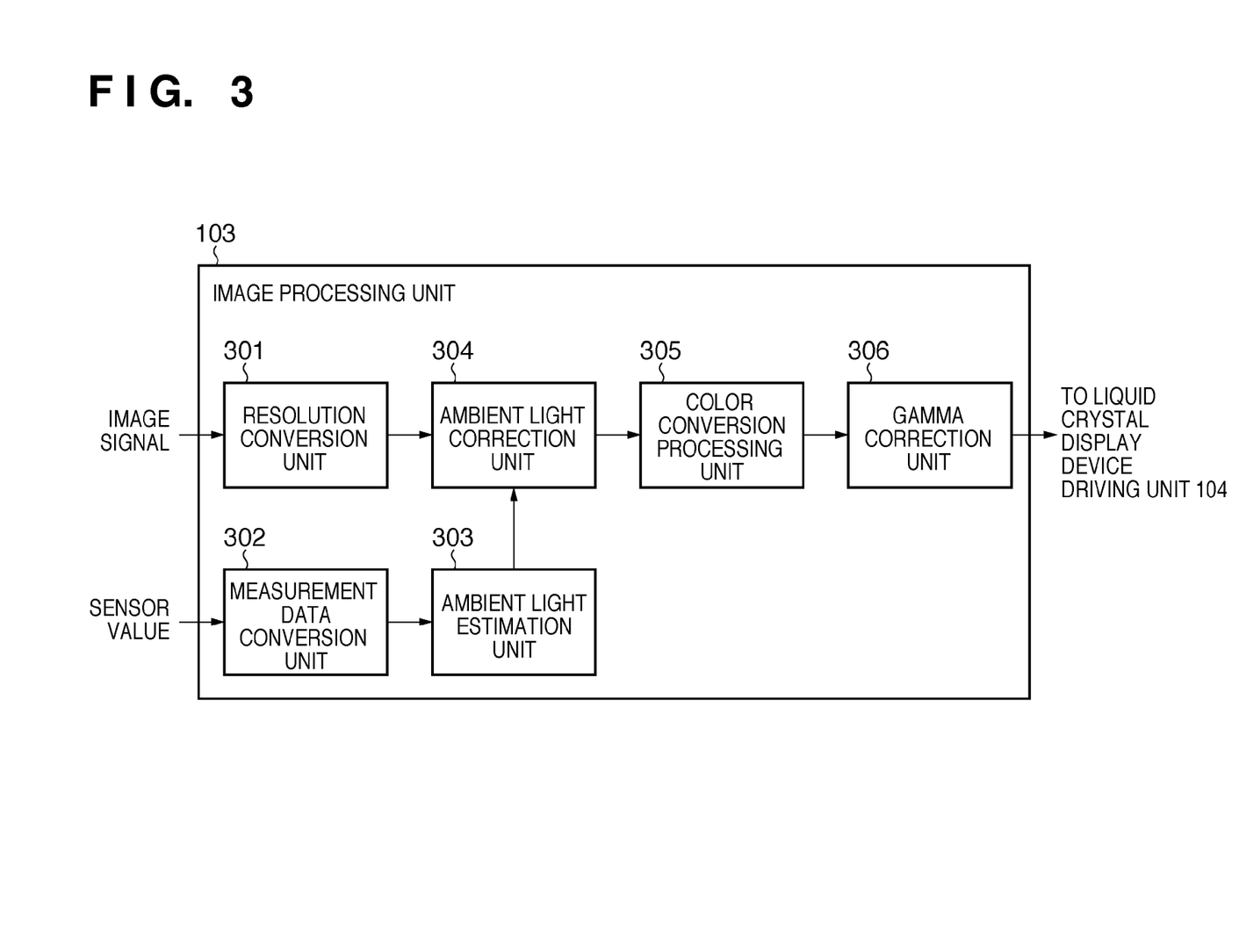
FIG. 3 is a functional block diagram showing an example of the arrangement of an image processing unit 103.

Note that in this embodiment, functions corresponding to, out of the constituent elements of the image processing unit 103 in FIG. 3, a measurement data conversion unit 302, ambient light estimation unit 303, and ambient light correction unit 304 can be implemented by causing the CPU 901 to execute corresponding programs. The programs are stored in the HD 903 or the ROM 906. Hence, in this embodiment, the resolution conversion unit of the image display apparatus 100 converts the resolution of an image signal that has undergone ambient light correction, and a color conversion processing unit 305 directly performs color conversion. At this time, a 3D-LUT designated for the information processing apparatus 130 is used, or an appropriate 3D-LUT is selected based on the notified type of light source.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-288415 filed Dec. 18, 2009 and No. 2010-268722 filed Dec. 1, 2010, which are hereby incorporated by reference herein in their entirety.

What is claimed is:

1. An image projection apparatus, comprising:
a projection unit that projects an image based on an input image signal;
a sensor that senses a mixture of ambient light around said apparatus and reflected projection light of the projection image;
a memory that stores a sensing result of the sensor, relating to an amount of projection light for the projection image by said projection unit;
an estimation unit that estimate a type of the ambient light, based on a plurality of the sensing results of the sensor; and
a correction unit that corrects the input image signal, based on the type of the ambient light estimated by said estimation unit,
wherein said estimation unit estimates a sensing result under a condition where said projection unit does not project the image, based on the plurality of the sensing results of the sensor, and
said estimation unit estimates the type of ambient light based on the estimated sensing result under the condition where said projection unit does not project the image.

2. The apparatus according to claim 1, wherein when the sensing result by said sensor falls outside a predetermined range after the estimation of the type of ambient light by said estimation unit, said estimation unit re-estimates the type of ambient light, based on the sensing result by the sensor after the sensing result falls outside the predetermined range.

3. The apparatus according to claim 1, wherein
the correction unit corrects the input image signal by using a lookup table corresponding to the type of ambient light.

4. The apparatus according to claim 1, wherein said correction unit performs the correction by subtracting a value based on the sensing result under the condition where said projection unit does not project the image from the input image signal.

5. The apparatus according to claim 1, wherein the sensor is installed in the apparatus.

6. An information processing apparatus for supplying an image signal to an image projection apparatus for projecting an image based on the image signal, comprising:
a memory that stores a sensing result of a sensor, relating to an amount of projection light for the projection image by a projection unit of said projection apparatus, wherein the sensor senses a mixture of ambient light around the projection apparatus and reflected projection light of the projection image by the projection unit;
an estimation unit that estimates type of ambient light, based on a plurality of the sensing results of the sensor; and
a correction unit that corrects the image signal, based on the type of ambient light estimated by said estimation unit,
wherein said estimation unit estimates a sensing result under a condition where said projection unit does not project the image, based on the plurality of the sensing results of the sensor, and
said estimation unit estimates the type of ambient light based on the estimated sensing result under the condition where said projection unit does not project the image.

7. The apparatus according to claim 6, wherein when the sensing result by said sensor falls outside a predetermined range after the estimation of the type of ambient light by said estimation unit, said estimation unit re-estimates the type of ambient light, based on the sensing result by the sensor after the sensing result falls outside the predetermined range.

8. The apparatus according to claim 6, wherein
said correction unit corrects the image signal by using a lookup table corresponding to the type of ambient light.

9. The apparatus according to claim 6, wherein said correction unit performs the correction by subtracting a value based on the sensing result under the condition where said projection unit does not project the image, from the image signal.

10. A method of controlling an image display projection apparatus, comprising steps of:
causing a projection unit to project an image based on an input image signal;
causing a sensor to sense a mixture of ambient light around the apparatus and reflected projection light of the projection image;
causing a memory to store a sensing result of the sensor, relating to an amount of projection light for the projection image by said projection unit;
causing an estimation unit to, estimate a type of the ambient light, based on a plurality of the sensing results of the sensor
causing a correction unit to correct the input image signal input, based on the type of ambient light estimated by said estimation unit,
wherein said estimation unit estimates a sensing result under a condition where said projection unit does not project the image, based on the plurality of the sensing results of the sensor, and
the estimation unit estimates the type of ambient light based on the estimated sensing result under the condition where said projection unit does not project the image.

11. The method according to claim 10, wherein when the sensing result by said sensor falls outside a predetermined range after the estimation of the type of ambient light by said estimation unit, said estimation unit re-estimates the type of ambient light, based on the sensing result by the sensor after the sensing result falls outside the predetermined range.

12. A method of controlling an information processing apparatus for supplying an image signal to an image projection apparatus for projecting an image based on the image signal, comprising steps of:
causing a memory to store a sensing result of a sensor, relating to an amount of projection light for the projection image by a projection unit of said projection apparatus, wherein the sensor senses a mixture of ambient light around the projection apparatus and reflected projection light of the projection image by the projection unit;

causing an estimation unit to estimate type of ambient light, based on a plurality of the sensing results of the sensor; and causing a correction unit to correct the image signal, based on the type of ambient light estimated by said estimation unit, wherein said estimation unit estimates a sensing result under a condition where said projection unit does not project the image, based on the plurality of the sensing results of the sensor, and said estimation unit estimates the type of ambient light based on the estimated sensing result under the condition where said projection unit does not project the image.

13. The method according to claim 12, wherein when the sensing result by said sensor falls outside a predetermined range after the estimation of the type of ambient light by said estimation unit, said estimation unit re-estimates the type of ambient light, based on the sensing result by the sensor after the sensing result falls outside the predetermined range.

14. A display apparatus including a display unit adapted to display an image based on input image signal, comprising:

an acquisition unit that acquires light information of a mixture of ambient light around the apparatus and reflected display light of the displayed image of the display unit when the display unit displays the image;

a memory that stores the light information acquired by said acquisition unit, relating to an amount of the display light for the displayed image by the display unit;

an estimation unit estimates a type of the ambient light, based on a plurality of pieces of the light information acquired by said acquisition unit; and a correction unit that corrects the input image signal, based on the type of the ambient light estimated by said estimation unit.

15. The apparatus according to claim 14, wherein when the light information acquired by said acquisition unit falls outside a predetermined range after the estimation of the type of ambient light by said estimation unit, said estimation unit re-estimates the type of ambient light, based on the light information acquired by said acquisition unit after the light information falls outside the predetermined range.

16. The apparatus according to claim 14, wherein the correction unit corrects the image signal by using a lookup table corresponding to the type of ambient light.

17. An information processing apparatus for supplying an image signal to a display apparatus including a display unit adapted to display an image, comprising:

an acquisition unit that acquires light information of a mixture of ambient light around the apparatus and reflected display light of the displayed image of the display unit, when the display unit displays the image;

a memory that stores the light information acquired by said acquisition unit, relating to an amount of the display light for the displayed image by the display unit;

an estimation unit that estimates a type of ambient light, based on a plurality of pieces of the light information acquired by said acquisition unit; and a correction unit that corrects the image signal, based on the type of the ambient light estimated by said estimation unit.

18. The apparatus according to claim 17, wherein when the light information acquired by said acquisition unit falls outside a predetermined range after the estimation of the type of ambient light by said estimation unit, said estimation unit re-estimates the type of ambient light, based on the light information acquired by said acquisition unit after the light information falls outside the predetermined range.

19. The apparatus according to claim 17, wherein said correction unit corrects the image signal by using a lookup table corresponding to the type of ambient light.

20. A method of controlling a display apparatus including a display unit adapted to display an image based on input image signal, comprising:

causing an acquisition unit to acquire light information of a mixture of ambient light around the apparatus and reflected display light of the displayed image of the display unit, when the display unit displays the image;

causing a memory to store the light information acquired by said acquisition unit, relating to an amount of the display light for the displayed image by the display unit;

causing an estimation unit to estimate a type of the ambient light, based on a plurality of pieces of the light information acquired by said acquisition unit causing a correction unit to correct the input image signal, based on the type of the ambient light estimated by said estimation unit.

* * * * *